(12) United States Patent
Cameros et al.

(10) Patent No.: US 9,043,635 B2
(45) Date of Patent: May 26, 2015

(54) TECHNIQUES FOR UPSTREAM FAILURE DETECTION AND FAILURE RECOVERY

(75) Inventors: Brian Cameros, Seattle, WA (US); Wade Albright, Concord, CA (US)

(73) Assignee: Shaw Parsing, LLC, Los Altos, CA (US)

( * ) Notice: Subject to any disclaimer, the term of this patent is extended or adjusted under 35 U.S.C. 154(b) by 1703 days.

(21) Appl. No.: 11/205,237

(22) Filed: Aug. 15, 2005
(Under 37 CFR 1.47)

(65) Prior Publication Data
US 2006/0075279 A1   Apr. 6, 2006

Related U.S. Application Data

(60) Provisional application No. 60/602,539, filed on Aug. 17, 2004.

(51) Int. Cl.
| | |
|---|---|
| *G06F 11/00* | (2006.01) |
| *H04L 29/08* | (2006.01) |
| *H04L 29/06* | (2006.01) |
| *H04L 29/14* | (2006.01) |

(52) U.S. Cl.
CPC ............ *H04L 67/2814* (2013.01); *H04L 65/80* (2013.01); *H04L 67/34* (2013.01); *H04L 67/02* (2013.01); *H04L 67/28* (2013.01); *H04L 69/40* (2013.01); *H04L 67/2809* (2013.01); *H04L 67/289* (2013.01)

(58) Field of Classification Search
USPC .............................................. 714/4, 4.11, 4.2
See application file for complete search history.

(56) References Cited

U.S. PATENT DOCUMENTS

| | | | |
|---|---|---|---|
| 5,230,048 | A | 7/1993 | Moy |
| 5,535,335 | A | 7/1996 | Cox et al. |
| 5,692,193 | A | 11/1997 | Jagannathan et al. |
| 5,699,523 | A | 12/1997 | Li et al. |
| 5,706,516 | A | 1/1998 | Chang et al. |
| 5,754,939 | A | 5/1998 | Herz et al. |
| 5,822,543 | A | 10/1998 | Dunn et al. |
| 5,878,420 | A | 3/1999 | de la Salle |
| 5,886,643 | A | 3/1999 | Diebboll et al. |
| 5,933,429 | A | 8/1999 | Bubenik et al. |

(Continued)

FOREIGN PATENT DOCUMENTS

| | | |
|---|---|---|
| CN | 101189852 A | 5/2008 |
| EP | 0 733 983 A2 | 9/1996 |

(Continued)

OTHER PUBLICATIONS

Non-Final Office Action dated May 3, 2005, U.S. Appl. No. 10/017,182, Tuttle et al., filed Dec. 14, 2001.

(Continued)

*Primary Examiner* — Jigar Patel
(74) *Attorney, Agent, or Firm* — Sterne, Kessler, Goldstein & Fox P.L.L.C.

(57) ABSTRACT

The content provider provides content to the first data center, which then provides the content to the client. The client determines that a failure between content provider and the first data center may have occurred. When the client determines that a failure may have occurred, the client may connect to a second data center to receive content from the content provider through the second data center. Accordingly, the failure is detected and additionally, automatic failure recovery may be provided at the client.

39 Claims, 4 Drawing Sheets

(56) References Cited

U.S. PATENT DOCUMENTS

| | | |
|---|---|---|
| 5,938,733 A | 8/1999 | Heimsoth et al. |
| 5,964,839 A | 10/1999 | Johnson et al. |
| 5,974,457 A | 10/1999 | Waclawsky et al. |
| 6,018,619 A | 1/2000 | Allard et al. |
| 6,029,175 A | 2/2000 | Chow et al. |
| 6,052,447 A | 4/2000 | Golden et al. |
| 6,055,493 A | 4/2000 | Ries et al. |
| 6,094,681 A | 7/2000 | Shaffer et al. |
| 6,112,240 A | 8/2000 | Pogue et al. |
| 6,138,158 A | 10/2000 | Boyle et al. |
| 6,173,406 B1 | 1/2001 | Wang et al. |
| 6,233,600 B1 | 5/2001 | Salas et al. |
| 6,240,451 B1 | 5/2001 | Campbell et al. |
| 6,253,167 B1 | 6/2001 | Matsuda et al. |
| 6,308,209 B1 | 10/2001 | Lecheler |
| 6,314,459 B1 | 11/2001 | Freeman |
| 6,324,587 B1 | 11/2001 | Trenbeath et al. |
| 6,363,421 B2 | 3/2002 | Barker et al. |
| 6,366,926 B1 | 4/2002 | Pohlmann et al. |
| 6,405,245 B1 | 6/2002 | Burson et al. |
| 6,408,282 B1 | 6/2002 | Buist |
| 6,418,448 B1 | 7/2002 | Sarkar |
| 6,418,467 B1 | 7/2002 | Schweitzer et al. |
| 6,446,257 B1 | 9/2002 | Pradhan et al. |
| 6,449,638 B1 | 9/2002 | Wecker et al. |
| 6,460,036 B1 | 10/2002 | Herz |
| 6,484,143 B1 | 11/2002 | Swildens et al. |
| 6,502,131 B1 | 12/2002 | Vaid et al. |
| 6,539,427 B1 | 3/2003 | Natarajan et al. |
| 6,553,413 B1 | 4/2003 | Leighton et al. |
| 6,560,611 B1 | 5/2003 | Nine et al. |
| 6,567,411 B2 | 5/2003 | Dahlen |
| 6,577,328 B2 | 6/2003 | Matsuda et al. |
| 6,606,596 B1 | 8/2003 | Zirngibl et al. |
| 6,606,643 B1 | 8/2003 | Emens et al. |
| 6,609,138 B1 | 8/2003 | Merriam |
| 6,654,804 B1 | 11/2003 | Fleming |
| 6,658,652 B1 | 12/2003 | Alexander et al. |
| 6,687,729 B1 | 2/2004 | Sievert et al. |
| 6,691,165 B1 | 2/2004 | Bruck et al. |
| 6,725,446 B1 | 4/2004 | Hahn et al. |
| 6,728,747 B1 * | 4/2004 | Jenkins et al. ............ 718/101 |
| 6,751,663 B1 | 6/2004 | Farrell et al. |
| 6,769,009 B1 | 7/2004 | Reisman |
| 6,789,115 B1 | 9/2004 | Singer et al. |
| 6,792,458 B1 | 9/2004 | Muret et al. |
| 6,829,642 B1 | 12/2004 | Giroir et al. |
| 6,836,886 B2 | 12/2004 | Tuerke et al. |
| 6,871,346 B1 | 3/2005 | Kumbalimutt et al. |
| 6,918,084 B1 | 7/2005 | Slaughter et al. |
| 6,970,924 B1 | 11/2005 | Chu et al. |
| 7,020,082 B2 | 3/2006 | Bhagavath et al. |
| 7,043,525 B2 | 5/2006 | Tuttle et al. |
| 7,051,070 B2 | 5/2006 | Tuttle et al. |
| 7,107,326 B1 | 9/2006 | Fijolek et al. |
| 7,127,720 B2 | 10/2006 | Cano et al. |
| 7,139,844 B2 | 11/2006 | Smith et al. |
| 7,159,034 B1 * | 1/2007 | Rai ............................. 709/238 |
| 7,207,043 B2 | 4/2007 | Blythe et al. |
| 7,209,959 B1 | 4/2007 | Campbell et al. |
| 7,249,197 B1 | 7/2007 | Roestenburg et al. |
| 7,263,547 B2 | 8/2007 | Kloba et al. |
| 7,277,917 B2 | 10/2007 | Tuttle et al. |
| 7,293,074 B1 | 11/2007 | Jellinek et al. |
| 7,350,213 B2 | 3/2008 | Deutesfeld et al. |
| 7,412,518 B1 | 8/2008 | Duigou et al. |
| 7,426,721 B1 | 9/2008 | Saulpagh et al. |
| 7,430,610 B2 | 9/2008 | Pace et al. |
| 7,516,177 B2 | 4/2009 | Knapp et al. |
| 7,565,359 B2 | 7/2009 | Nazem et al. |
| 2001/0012299 A1 | 8/2001 | Dahlen |
| 2001/0047426 A1 | 11/2001 | Hunter |
| 2002/0010757 A1 | 1/2002 | Granik et al. |
| 2002/0013852 A1 | 1/2002 | Janik |
| 2002/0024536 A1 | 2/2002 | Kahan et al. |
| 2002/0056004 A1 | 5/2002 | Smith et al. |
| 2002/0073165 A1 | 6/2002 | McNulty et al. |
| 2002/0078251 A1 | 6/2002 | Lewis |
| 2002/0087630 A1 | 7/2002 | Wu |
| 2002/0095399 A1 | 7/2002 | Devine et al. |
| 2002/0120717 A1 | 8/2002 | Giotta |
| 2003/0026254 A1 | 2/2003 | Sim |
| 2003/0041110 A1 * | 2/2003 | Wenocur et al. ............ 709/206 |
| 2003/0120817 A1 | 6/2003 | Ott et al. |
| 2003/0140111 A1 | 7/2003 | Pace et al. |
| 2004/0139433 A1 | 7/2004 | Blythe et al. |
| 2004/0148606 A1 | 7/2004 | Hosoe |
| 2004/0199926 A1 | 10/2004 | Gilgen et al. |
| 2004/0215493 A1 | 10/2004 | Koppes et al. |
| 2005/0027815 A1 * | 2/2005 | Christodoulou et al. ..... 709/217 |
| 2005/0033841 A1 | 2/2005 | McCarthy et al. |
| 2005/0125557 A1 * | 6/2005 | Vasudevan et al. .......... 709/239 |
| 2005/0278726 A1 | 12/2005 | Cano et al. |
| 2006/0031282 A1 | 2/2006 | Tuttle et al. |
| 2006/0031283 A1 | 2/2006 | Tuttle et al. |
| 2006/0041681 A1 | 2/2006 | Rumelhart |
| 2006/0117318 A1 | 6/2006 | Rumelhart et al. |
| 2006/0265488 A1 | 11/2006 | Tuttle et al. |
| 2007/0033293 A1 | 2/2007 | Rumelhart |
| 2007/0050519 A1 | 3/2007 | Cano et al. |
| 2007/0061811 A1 | 3/2007 | Rumelhart et al. |
| 2007/0239822 A1 * | 10/2007 | Tuttle et al. .................. 709/203 |
| 2009/0077173 A1 * | 3/2009 | Lowery et al. ............... 709/203 |

FOREIGN PATENT DOCUMENTS

| | | |
|---|---|---|
| EP | 0 749 081 A1 | 12/1996 |
| EP | 0 889 421 A1 | 1/1999 |
| EP | 1779636 | 5/2007 |
| JP | 2008510436 | 4/2008 |
| KR | 1020070083566 | 8/2007 |
| WO | WO 97/16796 A1 | 5/1997 |
| WO | WO 01/63837 A2 | 8/2001 |
| WO | WO2005/046184 A | 5/2005 |
| WO | WO 2006/023508 A1 | 3/2006 |

OTHER PUBLICATIONS

Notice of Allowance dated Jan. 3, 2006, U.S. Appl. No. 10/105,018, Tuttle et al., filed Mar. 21, 2002.

Notice of Allowance dated Jul. 5, 2006, U.S. Appl. No. 10/105,018, Tuttle et al., filed Mar. 21, 2002.

Non-Final Office Action dated Aug. 9, 2005, U.S. Appl. No. 10/213,269, Cano et al., filed Aug. 5, 2002.

Final Office Action dated Jan. 26, 2006, U.S. Appl. No. 10/213,269, Cano et al., filed Aug. 5, 2002.

Notice of Allowance dated Jun. 6, 2006, U.S. Appl. No. 10/213,269, Cano et al., filed Aug. 5, 2002.

Non-Final Office Action dated Feb. 3, 2009, U.S. Appl. No. 11/205,233, Rumelhart et al., filed Aug. 15, 2005.

Non-Final Office Action dated Aug. 6, 2009, U.S. Appl. No. 11/205,233, Rumelhart et al., filed Aug. 15, 2005.

Notice of Allowance dated May 22, 2007, U.S. Appl. No. 11/347,802, Tuttle et al., filed Feb. 3, 2006.

Non-Final Office Action dated Jan. 26, 2007, U.S. Appl. No. 11/347,802, Tuttle et al., filed Feb. 3, 2006.

Non-Final Office Action dated Jul. 23, 2009, U.S. Appl. No. 11/396,251, Tuttle et al., filed Mar. 3, 2006.

Non-Final Office Action dated Mar. 6, 2009, U.S. Appl. No. 11/515,233, Rumelhart et al., filed Aug. 31, 2006.

Non-Final Office Action dated Oct. 26, 2009, U.S. Appl. No. 11/205,263, Rumelhart et al., filed Aug. 15, 2005.

Final Office Action dated Oct. 7, 2009, U.S. Appl. No. 11/515,233, Rumelhart et al., filed Aug. 31, 2006.

Non-Final Office Action dated Jan. 19, 2010, U.S. Appl. No. 11/396,251, Tuttle et al., filed Mar. 30, 2006.

Non-Final Office Action dated Jan. 7, 2010, U.S. Appl. No. 11/205,233, Rumelhart, filed Aug. 15, 2005.

Non-Final Office Action dated Feb. 22, 2010, U.S. Appl. No. 11/515,233, Rumelhart et al., filed Aug. 31, 2006.

(56) References Cited

OTHER PUBLICATIONS

Final Office Action dated Mar. 23, 2010, U.S. Appl. No. 11/205,263, Rumelhart et al., filed Aug. 15, 2005.
Office Action from Chinese Appl. No. 200580027440.5 dated May 25, 2010, 39 pgs.
Office Action dated May 25, 2010, Chinese Appl. No. 200580027440.5, 36 pgs.
English Language Abstract for Chinese Pub. No. 101189852, filed Aug. 15, 2005, 1 pg.
English Language Abstract for Japanese Pub. No. 2008510436, filed Aug. 15, 2005, 1 pg.
English Language Abstract for Korean Pub. No. 10-2007-0083566, filed Aug. 15, 2005, 1 pg.
Office Action dated Sep. 1, 2010, Japanese Appl. No. 2007-527956, 3 pgs.
Office Action dated Oct. 25, 2010, Chinese Appl. No. 200580027440.5, 8 pgs.
Franklin et al., "Dissemination-Based Information Systems," IEEE Data Engineering Bulletin, vol. 19, No. 3, Sep. 1996, 9 pages.
Nagami et al., "Toshiba's Flow Attribute Notification Protocol (FANP) Specification," Apr. 1997, RFC 2129, Internet RFC/STD/FYI/BCP Archives [online], [retrieved on May 16, 2002]. Retrived from the Internet: <landfield.com/rfcs/rfc2129.html>, 16 pages.
Strom et al., "Gryphon: An Information Flow Based Approach to Message Brokering," International Symposium on Software Reliability Engineering '98, 1998, 2 pages.
Sturman et al., "Reflection in the Gryphon Message Brokering System," Reflection Workshop of the 13.sup.th ACM Conference on Object Oriented Program Systems, Languages and Applications (OOPSLA '98), 1998, 5 pages.
International DOI Foundation, "Introduction to the Digital Object Identifier," [online]. Apr. 1998 [retrieved on May 16, 2002]. Retrieved from the Internet: <doi.org/introduction.html.>, 4 pages.
Aksoy et al., "Research in Data Broadcast and Dissemination", Proc. 1st Int'l Conf. on Advanced Multimedia Content Processing, Osaka University, Osaka, Japan, Nov. 1998.
Banavar et al., "An Efficient Multicast Protocol for Content-Based Publish-Subscribe Systems," Proc. of the 19th International Conference on Distributed Computing Systems, 1999, 9 pages.
Banavar et al., "Information Flow Based Event Distribution Middleware," Proceedings of the 1999 ICDCS Workshop on Electronic Commerce and Web-Based Applications, 1999, 8 pages.
Aguilera et al., "Matching Events in a Content-based Subscription System," Eighteenth ACM Symposium on Principles of Distributed Computing (PODC '99), Atlanta, GA, May 4-6, 1999, 9 pages.
Banavar et al., "A Case for Message Oriented Middleware," Distributed Computing, 13.sup.th International Symposium, Bratislava, Slavak Republic, Sep. 27-29, 1999, 18 pages.
Aguilera et al., "Efficient Atomic Broadcast Using Deterministic Merge," Symposium on Principles of Distributed Computing, 2000, 10 pages.
Opyrchal et al., "Exploiting IP Multicast in Content-Based Publish-Subscribe Systems," Proceedings of the IFIP/ACM International Conference on Distributed Systems Platforms (Middleware 2000), Apr. 2000, 23 pages.
Caplin Systems Ltd., White Paper "Real Time Text Protocol (RTTP)," Version 1.1, Sep. 2000, 11 pages.
Reuters, "Reuters Market Data Systems and the Trading Solutions Architecture," Version 1.0, Jan. 12, 2001, 51 pages.
Ramamrithan et al., "Dissemination of Dynamic Data on the Internet," [online]. Powerpoint Presentation, Spring 2001, [retrieved on Feb. 6, 2002], 5 pages. Retrieved from the Internet <.cs.umbc.edu/courses/graduate/CMSC691T/spring.sub.--2001/rlist/amit.ppt>.
ComputerLetter, vol. 17, No. 23, Jul. 16, 2001, pp. 1-8.
ComputerLetter, vol. 17, No. 31, Sep. 24, 2001, pp. 1-6.
ComputerLetter, vol. 17, No. 35, Nov. 5, 2001, pp. 1-6.
Tuttle et al., "Upstream Delivery of Information in a Digital Network", U.S. Appl. No. 09/901,582, filed Jul. 9, 2001.
"Repackaging the Net", ComputerLetter, vol. 17, No. 35, Nov. 5, 2001, pp. 1-5.
"Reckoning with IP", ComputerLetter, vol. 17, No. 37, Nov. 19, 2001, pp. 1-6.
"Persistence Counts", ComputerLetter, vol. 17, No. 23, Jul. 16, 2001, pp. 1, 5-7.
Zhao et al.; "A Workflow-centric Study of Organizational Knowledge Distribution;" Proceedings of the 33rd Hawaii International Conference on System Sciences; 2000; pp. 1-10; IEEE.
Gribble, et al.; "The Ninja Architecture for Robust Internet-scale Systems and Services;" Computer Networks; 2001; pp. 473-497; vol. 35; Elsevier Science B.V.
Carmona, David; "Programming the Thread Pool in the .NET Framework"; 'Online' Jun. 2002, pp. 1-17, XP002357234; retrieved on Dec. 1, 2005 from the Internet: URL:http://msdn.microsoft.com/library/default.asp?url=/library/en-us/dndotnet/hmtl/progthrepool.asp>, pp. 1-17.
Welsh, Matthew D.; "An Architecture for Highly Concurrent, Well-Conditioned Internet Services"; URL: http://www.eecs.harvard.edu/{mdw/papers/mdw-phdthesis/pdf>, 2005, pp. 48-54, 101, and 113-114.
Written Opinion of the International Searching Authority for International Application No. PCT/US2005/029162, recorded Jan. 17, 2006, 7 pages.
Written Opinion of the International Searching Authority for International Application No. PCT/US2005/029021, recorded Dec. 14, 2005, 10 pages.
Written Opinion of the International Searching Authority for International Application No. PCT/US2005/029158, recorded Jan. 25, 2006, 7 pages.

* cited by examiner

TECHNIQUES FOR UPSTREAM FAILURE DETECTION AND FAILURE RECOVERY

CROSS-REFERENCES TO RELATED APPLICATIONS

This application claims priority from U.S. Provisional Patent Application No. 60/602,539, Aug. 17, 2004 entitled "TECHNIQUES FOR DELIVERING PERSONALIZED CONTENT WITH A REAL-TIME ROUTING NETWORK, MODULAR EVENT-DRIVEN ARCHITECTURE, MODULAR EVENT-DRIVEN PROCESSING AND VIEWER FAILOVER", which is hereby incorporated by reference, as if set forth in full in this document, for all purposes.

BACKGROUND

Embodiments of the present disclosure generally relate to telecommunications and to techniques for detecting upstream failures and providing failure recovery.

A company may have a data center to route content from a content provider to a client. Multiple data centers may be used to separately route content received from the content provider to clients.

Sport scores, stock quotes, news telecasts, etc. may be routed from a content provider through a data center to a client. When a client desires some content to be routed to it, the client may connect to one of the company's data centers.

Failures may occur between the client and data center or between the content provider and data center when delivering content. Because the client is connected to the data center, the client may detect if a failure between the client and data center occurs. The client may not be able to determine if a connection between the content provider and data center fails. This may be because the connection between the content provider and data center is independent from the client.

A further understanding of the nature and the advantages of the subject matter disclosed herein may be realized by reference of the remaining portions of the specification and the attached drawings.

DETAILED DESCRIPTION

Figure 1:
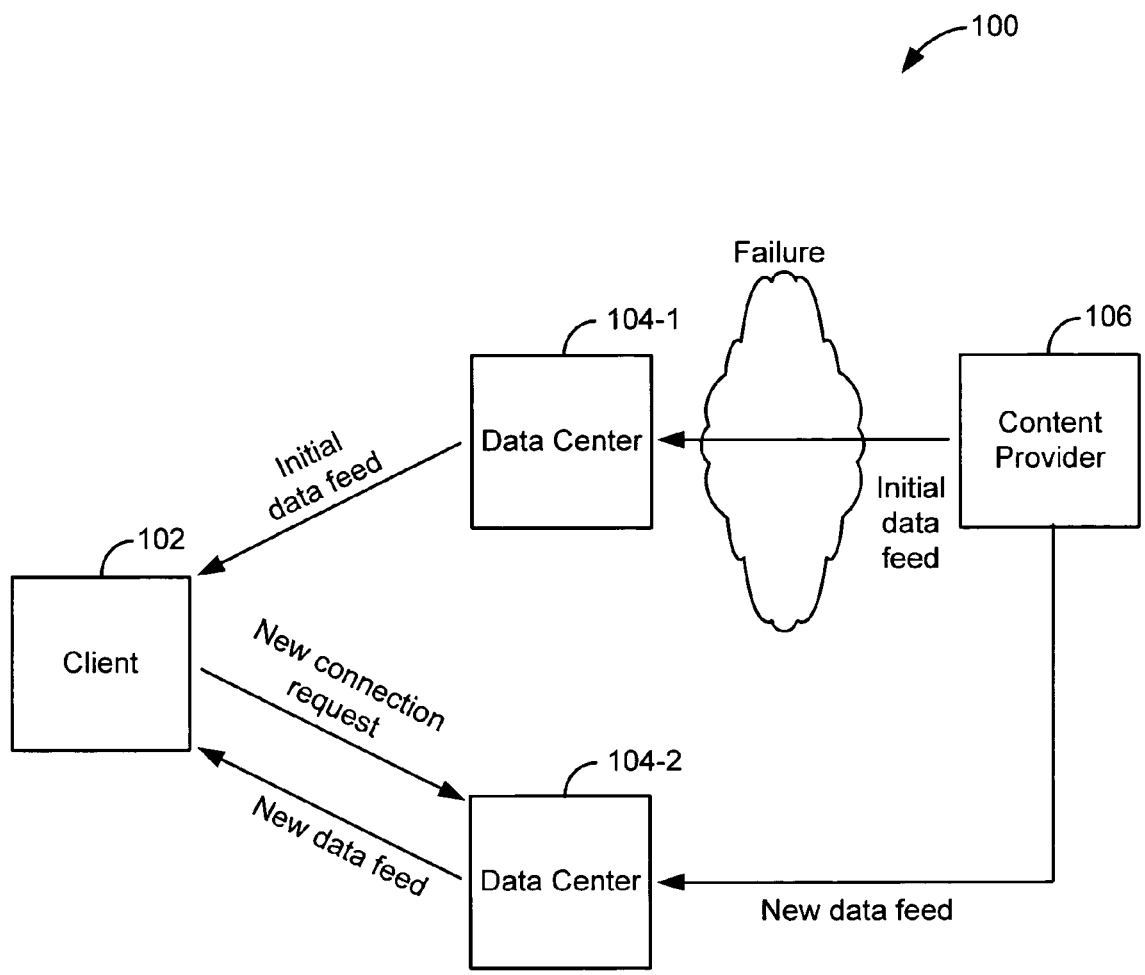
FIG. 1 depicts a system for providing failure detection and failure recovery according to one embodiment.

FIG. 1 depicts a system 100 for providing upstream failure detection and failure recovery according to one embodiment. As shown, system 100 may include a client 102, one or more data centers 104, and a content provider 106. It will be understood that any number of the above systems, such as multiple clients 102, more than two data centers 104, and multiple content providers 106, may be included in system 100.

Client 102 may be any entity capable of receiving content from a data center 104. Client 102 may include an interface running on a computing device, mobile device, personal digital assistant (PDA), cellular phone, Blackberry device, Goodlink device, mobile email device, personal computer, laptop computer, television, pocket PC, etc. In one embodiment, the interface may be a web browser, such as Microsoft's Internet Explorer™, Netscape's Navigator™, Mozilla's Firefox™, etc. A web browser may be capable of downloading web pages. These web pages display information or content that may be received from a content provider 106. For example, a content provider, such as CNN, may provide a web page. The web page may be downloaded using a uniform resource locator (URL), such as www.CNN.com, or any other identifier. Although a web page may be described, it will be understood that any other software application, such as a spreadsheet, word processing program, email program, etc., may be used at client 102 to receive content.

Data center 104 may provide content to client 102. The content may be audio, video, metadata, web pages, sports scores, etc. In one embodiment, data center 104 may include a routing network that may be capable of receiving content from content provider 106 and also to forward the content to client 102. Examples of a routing network are described in U.S. patent application Ser. No. 10/017,182, entitled "Asynchronous Messaging Using a Dynamic Routing Network", filed Dec. 14, 2001; U.S. patent application Ser. No. 10/105,018, entitled "Asynchronous Messaging Using a Node Specialization Architecture In the Dynamic Routing Network", filed Mar. 21, 2002; and U.S. patent application Ser. No. 10/213,269, entitled "Storing State In a Dynamic Content Routing Network", filed Aug. 5, 2002, all of which are incorporated by reference in their entirety for all purposes.

Content provider 106 may be any system that supplies content. For example, content provider 106 may be systems associated with news providers, sports providers, cable programming providers, phone companies, systems that provide movies on demand, music providers, etc. In one embodiment, content providers 106 provide live content. Live content may be content that may be dynamically changing over time. For example, sports scores may be updated as a game may be in progress. Additionally, news feeds may be provided as they come across the news wire or stock quotes may be provided in real-time.

A flow of data through system 100 will now be described in addition to the failure detection and failure recovery techniques in accordance with an embodiment. Client 102 may make a connection request for content from a content provider 106. For example, client 102 may request a web page from content provider 106 using a URL. Data center 104 receives the request and may enable client 102 to receive the content.

A data center 104-1 (or data center 104-2 in other embodiments) may set up a connection with client 102 in order to provide content from content provider 106 to client 102. In one embodiment, a web page may be downloaded at client 102 and content may be displayed. The web page may include live content. In one embodiment, the live content may be dynamically updated. In this case, content may be sent from content provider 106 to data center 104-1. Data center 104-1 then sends the content to client 102, where the content can be dynamically updated on the web page.

In one embodiment, client 102 may determine a failure occurred between the connection of content provider 106 and data center 104-1. The failure may be determined based on a number of reasons. For example, data should be received at client 102 at certain intervals from content provider 106. If data is not received at client 102, a failure may be determined. The data may not be received for a number of reasons, such as a network failure, data loss during transmission, etc.

A status message may be set up where client 102 monitors the status message at certain intervals. The status message may be any message sent by content provider 106 at a known interval. For example, the status message may be any live object being displayed on a web page. If the status message is not received after a certain interval, client 102 may determine that an upstream failure between content provider 106 and data center 104-1 may have occurred. In one embodiment, the failure may be determined when the status message is not received. It may be possible that a failure has not occurred but the message was lost. Thus, client 102 may wait a certain period of time before determining a failure occurred to compensate for possible lost messages. The time period may be a number of seconds, minutes, etc. Although using a status message may be described, it will be understood that other ways determining a failure will be appreciated.

When a failure is determined, client 102 may automatically attempt to connect to another data center, such as data center 104-2. Data center 104-2 may also receive the data feed from content provider 106, but it may be received through a different network or route. For example, data center 104-2 may be a New York data center and data center 104-1 may be a San Francisco data center.

Client 102 may send a new connection request to data center 104-2 in order to receive the new data feed. Conventionally, client 102 would have to initiate a new request that would require user intervention. For example, a user may have to either type in the URL for a content provider 106 and send that request for that URL, or perform other actions such as selecting a refresh button on an interface. As will be discussed below, an application may be downloaded from a server that may be used to set up the connection. Interface security restrictions may not allow an application downloaded from a server to connect to a different server (data center). For example, if an application is unsigned and will run inside an interface, the interface may only be allowed to open connections to servers with the same IP address from where the application was downloaded. Thus, a new request may have to be performed to connect to a new data center. In one embodiment, however, application may be allowed to automatically connect to data center 104-2 in a seamless manner without user intervention.

In some embodiments, client 102 may connect to a new data center 104 when it is determined that a failure has occurred between content provider 106 and a data center 104. Interruptions in the data feed that may be undesirable when live information is being received may be avoided. Further, if the information being received is sensitive information, clients 102 do not want to lose any of this information. Accordingly, in one embodiment, determining that the upstream failure between content provider 106 and data center 104 occurred in addition to providing seamless failure recovery may be performed.

Figure 2:
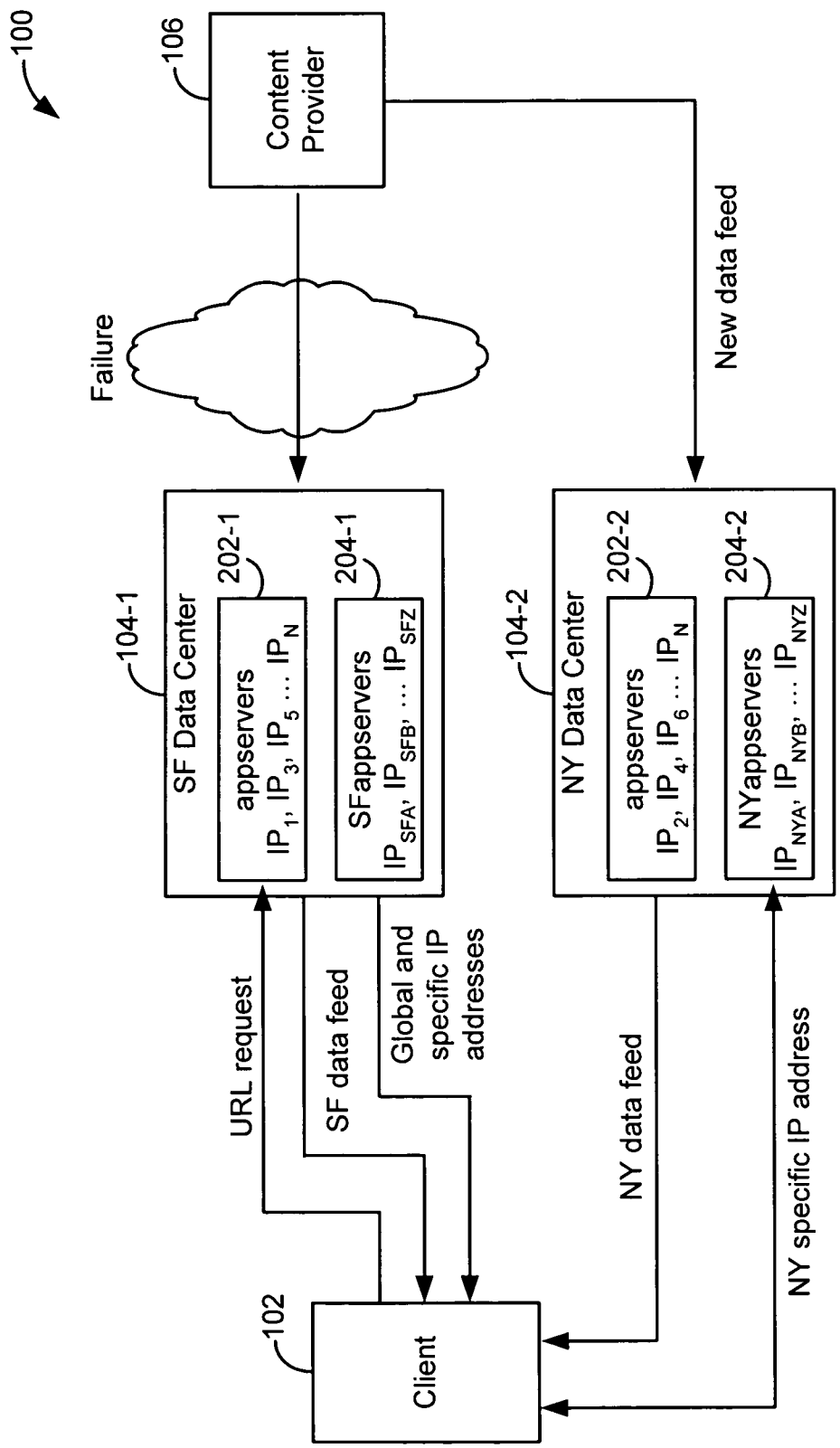
FIG. 2 depicts an embodiment of the system of FIG. 1.

FIG. 2 depicts an embodiment of system 100 in FIG. 1. Client 102 may send a first connection request for an identifier, such as a URL. The URL request may be for content from content provider 106. In response to sending the request, information such as a document, web page, software application, etc., may be received from one of the data centers 104 that may be capable of routing content for content provider 106. In one embodiment, algorithms may be used in order to determine which data center 104 will first process the request. For example, if client 102 is closest to San Francisco, a S.F. data center 104-1 may be chosen to service the request. For discussion purposes, it may be assumed that S.F. data center 104-1 may be selected to process the request.

In response to the request, the information may be downloaded at client 102. This information includes application download information (e.g., an applet tag) that may be capable of downloading an application. The application may be a JavaScript applet, VBscripts, or any other scripting language application, or piece of software code. In one embodiment, the information may include the name of the application, an identifier, such as a URL, and any parameters that may be needed to download the application.

Client 102 then attempts to download the application using the application download information, such as the URL. In attempting to download the application, client 102 has to resolve the IP addresses of a server associated with the URL. For example, if the URL may be called https://appserver.bangnetworks.net/filename, the server may be referred to as "appserver". Client 102 has to thus resolve an IP address for appserver.

A single URL may resolve to a certain number of IP addresses, such as ten. Although IP addresses may be described, it will be understood that addresses other than IP addresses may be used. In a typical case, a company managing the target URL supplies a domain name server (DNS) that provides the multiple IP addresses to return for a particular URL. The multiple IP addresses correspond to servers that can serve the document associated with the URL. Client 102 attempts to connect to the first returned IP address, and then tries a second IP address if the first one fails, and so on. The order of IP addresses that may be returned may be changed when they are sent to client 102. One technique may be to rotate the addresses in a round robin fashion based on sequential requests. Another technique may be to use smart IP address ordering, such that ordering the IP addresses may be performed to find a server closest to client 102 first. Another technique may be to provide a plug-in facility where a content provider 106 that may be managing the URL provides a module for sending URLs to the requesters.

In one embodiment, IP addresses may be returned in one or more groups, for example, global and/or specific. The global IP addresses may correspond to the URL originally requested by the application, https://appserver.bangnetworks.net, which may correspond to servers found in either SF data center 104-1 or NY data center 104-2. The specific IP addresses may correspond to either SF or NY data center URLs, e.g., https://sfappserver.bangnetworks.net or https://nyappserver.bangnetworks.net. Accordingly, the specific IP addresses may correspond to different URLs from the URL that corresponds to the global IP addresses.

The IP addresses may be returned in a list that includes global IP addresses and/or specific IP addresses. In one embodiment, the IP addresses may be referred to as $IP_{1-n}$ for the global IP addresses and $IP_{a-z}$ for the specific IP addresses. Accordingly, the IP address list sent in response to a resolution of IP addresses for the URL https://appserver.bangnetworks.net may be: $IP_1, IP_2, IP_3, \ldots IP_6 | IP_a, IP_b, \ldots$.

In one embodiment, the IP address list may be returned in a fixed order. However, the order of the IP addresses in either of the groups may change. In one embodiment, the global IP addresses may be placed first. This may be because, when the first connection may be made, the first IP addresses in the list may be tried by the application in order to connect to the server. If some of those IP addresses do not work, the IP addresses may be subsequently tried in order. By providing the specific IP addresses at the end, it may be most likely that they will not be tried before a connection may be made to one of the global IP addresses.

As shown in FIG. 2, certain IP addresses may correspond to different servers, which may be global appservers 202 or specific appservers 204. Global appservers may be labeled as appservers 202-1 and appservers 202-2, and specific appservers may be labeled as sfappservers 204-1 and nyappservers 204-2. Appservers 202-1 and 202-2 correspond to the global URL and may be found in both SF data center 104-1 and NY data center 104-2. Also, SFappservers 204-1 may be specific to SF data center 104-1 and correspond to the SF data center URL. Nyappservers 204-2 may be associated with NY data center 104-2 and correspond to the NY data center URL.

Various IP addresses may be associated with the above global appservers 202 and specific appservers 204. These IP addresses may correspond to different servers associated with each data center 104. Depending on the IP address that may be requested, a different server may be chosen to serve content to client 102. As shown, the appservers found in SF data center 104-1 may include the IP addresses $IP_1$, $IP_3$, $IP_5$, etc., and appservers found in NY data center 104-2 may include the IP addresses $IP_2$, $IP_2$, $IP_6$, etc. Thus, different global IP addresses may be associated with different servers in SF data center 104-1 and NY data center 104-2. SFappservers 204-1 and NYappservers 204-2 also may be associated with different IP addresses labeled $IP_{SFA}$, $IP_{SFB}$, etc., for SF data center 104-1 and $IP_{NYA}$, $IP_{NYB}$, etc. for NY data center 104-2.

The application download information in the document received may be used to download the application from the global URL, https://appserver.bangnetworks.net using one of the global IP addresses. Client 102 may start requesting the application using the IP addresses that may be first returned in a list. Accordingly, because the global IP addresses may be found at the front of the list, it may be expected that the application is downloaded from one of the global IP addresses. A server corresponding to one of the global IP address receives the request. This may be an appserver in either SF data center 104-1 or NY data center 104-2.

In one embodiment, in order to provide a secure connection, the server includes logic that uses a certificate that identifies itself as "appserver" in response to the URL request using one of the global IP addresses. This allows a secure connection. The application may then be downloaded to client 102 from the server. For discussion purposes, it may be assumed that the global IP address used in the request corresponds to a server in appservers 202-1.

In one embodiment, the application that may be downloaded is an unsigned application. An unsigned application may be transparent to a user in that typically permission does not need to be asked of a client 102 to run the unsigned application. For example, if a signed application is used, this may cause a browser to pop up a dialog box asking a user "Do you want to trust this application . . . ?". This may require that a user to click accept or don't accept. This may cause confusion for a user and thus an unsigned application may be used; however, it will be understood that a signed application may also be used.

The application may then create a connection to the selected server 202-1 in order to receive content from content provider 106 through SF data center 104-1. In order to provide the connection, the application may do a reverse look-up in order to convert the IP addresses into URLs for the data centers. This may be done because standard protocol specifies that requests for connections should be made using the URLs that may be associated with an IP address.

In one embodiment, client 102 registers object IDs that may be used to serve content to client 102. The content may then be served from content provider 106 through SF data center 104-1 to client 102. In one embodiment, content provider 106 may provide content for the IDs. SF data center 104-1 then may determine which IDs that client 102 registered for and may provide the content for those IDs to client 102.

In registering the IDs, client 102 may set up a status message. The status message may be any message that may be sent from content provider 106 to client 102 at recurring intervals. In one embodiment, the registration may specify an ID that will be used as the status message. Client 102 selects an ID where content will be served from content provider 106 at certain intervals. For example, if content for an ID will be served at 60-second intervals, then that ID may be chosen by client 102 as the status message. Thus, if a stock quote for an ID will be updated every 60 seconds, then the ID for the stock quote may be used as the status message. If no IDs will be updated in a short enough interval, then an ID may be created for the status message. This ID will then be updated at a chosen interval with any kind of data (e.g., dummy data).

Content provider 106 may be capable of providing the status message. In one embodiment, content provider 106 may delegate the sending of the status message to any entity, such as another source, third party, etc. Also, although a monitor for the status message is discussed as being set up at client 102, it will be understood that the monitor may be placed at other locations, such as a third party, or alternatively, at SF data center 104-1.

Client 102 then monitors the status message to see if content may be received at certain intervals for the ID. If content is not received, client 102 may determine that a failure has occurred between content provider 106 and SF data center 104-1. In one embodiment, client 102 may determine that a failure has occurred based on certain conditions or rules. For example, if data is not received after a certain number of intervals, such as two or three intervals, then a failure may be determined.

When a failure is determined, the application at client 102 may be capable of connecting to a different data center 104 in order to receive the content from content provider 106. This eliminates any down time for client 102. This transition may be seamless to the user of client 102.

An unsigned application (e.g., Java applet) may be downloaded into an interface and run in the interface such that it can only open up connections to servers having the same IP address as the server from which the application was downloaded. This restriction may be in place to prevent an application from sending data all over a network such as the Internet. Further, the use of secure connections may complicate matters. The application may use a secure connection in order to prevent others from intercepting the content updates. Secure connections may be set up using a certificate exchange. Each certificate contains a text field explicitly identifying the URL of the server that sent the certificate. If the certificate's URL does not match the actual URL associated with a server from which the certificate was obtained, an error results. This happens at a high level and cannot be changed by an application executing on client 102. Accordingly, if a certificate from a different URL is sent to the application, an error may result.

As was discussed previously, global IP addresses and specific IP addresses may be returned when the DNS resolution is first performed by client 102. The application may be capable of connecting to one of the specific IP addresses if a failure is determined. In the above case, the IP addresses $IP_{NYA}$, $IP_{NYB}$, . . . $IP_{NYZ}$ may have been returned as specific IP addresses in the DNS resolution.

The application may attempt to connect to the first one of the specific IP addresses. In this process, the IP address may be resolved to a name that corresponds to the IP address. For example, IP address $IP_{NYA}$ resolves to the specific URL of https://nyappserver.bangnetworks.net. This specific IP address may be different from the global IP address that the application was downloaded from. The application then may attempt to connect to the specific URL. When the connection request is made, a DNS resolution may be performed to determine IP addresses associated with the URL http://nyappserver.bangnetworks.com. In this case, because the specific IP addresses for the NY data URL were included in the original DNS resolution, the application may be allowed to connect to those IP addresses for the specific URL. However, if the specific IP addresses were not included in the original DNS resolution when client 102 connected to the global URL, then connection may not be allowed.

A server corresponding to a specific IP address, such as $IP_{NY4}$, may return a certificate that corresponds to the specific URL used to connect to the server. Because the application used that specific URL to connect to the server, a secure connection may be allowed and the secure connection may be established.

The application can then register the object IDs, set up another heartbeat, and perform any other steps that were performed originally to set up the content feed from content provider 106. Thus, the same content for the IDs that were previously registered may be still received by client 102. However, the content may be provided from content provider 106 through NY data center 104-2 instead of SF data center 104-1.

Accordingly, in light of a determined failure, the client 102 may be able to automatically connect to a different data center 104. The data center and the failure recovery have different URL addresses, but the transition may be made in a seamless manner that may be transparent to a user. Accordingly, a user may not have to take affirmative steps in order to reconnect to content provider 106 after an upstream failure. For example, a user may not have to select a "refresh" button on an interface or perform any other affirmative actions to automatically connect to the second data center. Further, an application from the new data center may not have to be downloaded in order to connect to a new server.

Figure 3:
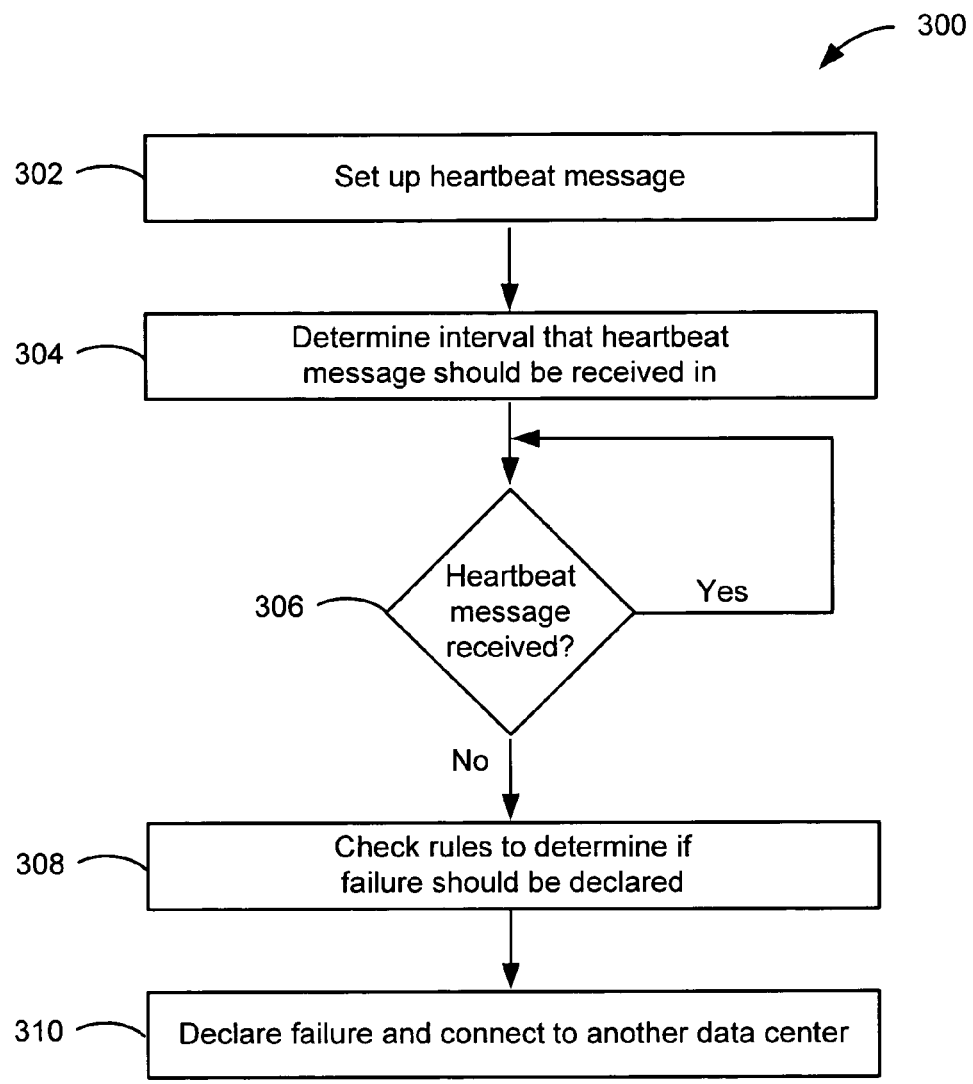
FIG. 3 depicts a simplified flowchart of a method for determining that a failure has occurred according to one embodiment.

FIG. 3 depicts a simplified flowchart 300 of a method for determining that a failure has occurred according to one embodiment. In step 302, a status message may be set up. For example, the status message may be associated with an ID. The status message may be any ID from which content may be being served from content provider 106.

In step 304, an interval in which content for the ID should be updated may be determined. This interval may be set up by content provider 106 or client 102.

In step 306, it may be determined if the status message has not been received at a specified interval. If the status message has been received, the process reiterates to continually check at certain intervals if the status message is not received.

In step 308, rules may be checked for the status message to determine if a failure should be declared. For example, rules may indicate that certain conditions should be satisfied before a failure may be determined. One rule may be if the status message is not received a certain number of times, a failure may be determined. Other factors, such as network statistics, may also be retrieved and evaluated before a failure is determined. Also, the failure to receive the status message once may be enough to determine that a failure occurred.

In step 310, if the rules are satisfied, a failure may be determined and a connection to a second data center may be initiated.

Figure 4:
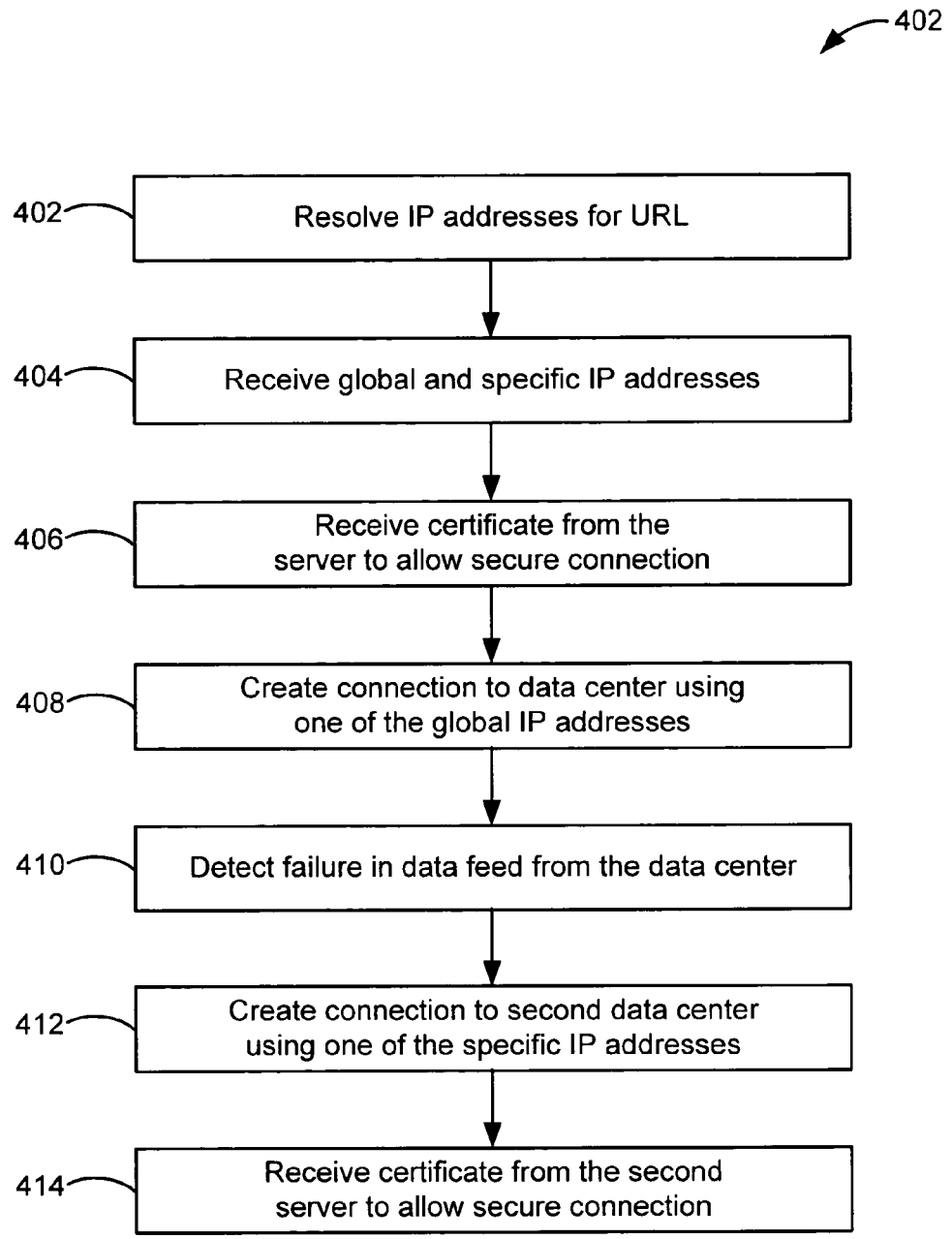
FIG. 4 depicts a simplified flowchart of a method for securely connecting to different data centers according to one embodiment.

FIG. 4 depicts a simplified flowchart 400 of a method for securely connecting to different data centers 104 according to one embodiment. In step 402, an IP address resolution for a URL, or any other identifier, may be performed.

In step 404, global and specific IP addresses may be received from a server associated with the URL.

In step 406, a certificate from the server to allow a secure connection may be received. The certificate may be associated with the URL that was used to request the connection. For example, a text field in the certificate includes the URL.

In step 408, a connection may be created through a data center 104-1 using one of the global IP addresses.

In step 410, a failure may be determined in a data feed from the data center 104-1. The failure may be an upstream failure between the content provider 106 and data center 104-1.

In step 412, a connection may be created to a second data center 104-2 using one of the specific IP addresses. The connection may be made to a different URL than that which was used to create the connection in step 402. In one embodiment, a reverse lookup for the specific IP addresses may be used to determine the different URL.

In step 414, a certificate may be received from a second server to allow a connection associated with the second URL. Because the certificate may resolve to the second URL that was used to request the connection to the second data center 104-2, a secure connection may be allowed.

Many advantages may be provided. For example, upstream failure detection may be provided with failure recovery such that loss of live data may be minimized. The failure recovery may be automatically performed at the client. A user also does not need to take any steps in the failure recovery. An application may automatically transfer the connection to another data center at a different address. Thus, a user may not be involved in the failure recovery operation.

In one embodiment, the term "and/or" may indicate that any combination of elements connected by "and/or" may be used. For example, two words or expressions in a phrase using "and/or" may mean one or the other or both. In one embodiment, the term "substantially" may mean being largely but not wholly that which is specified, or all that is specified. In one embodiment, the term capable of may mean configured, adapted, able, etc. For example, the term capable of performing an action may mean an element may be able to perform the action, may be configured to perform the action and/or may be adapted to perform the action.

The disclosed subject matter may be implemented in the form of control logic in software or hardware or a combination of both. The control logic may be stored in an information storage medium as a plurality of instructions adapted to direct an information processing device to perform a set of steps disclosed in one embodiment. Based on the disclosure and teachings provided herein, a person of ordinary skill in the art will appreciate other ways and/or methods to implement the subject matter of the disclosure.

The above description is illustrative but not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

What is claimed is:

1. A non-transitory computer-readable medium having instructions stored thereon, the instructions comprising:
   instructions to identify, at a client, a first data center among a plurality of data centers that is closest to the client, the first data center being configured to receive content from at least a first content provider;
   instructions to receive, at the client, an application from the first data center; and instructions to determine, at the client, that a failure occurred between the at least a first content provider and the first data center if a status message, configured to be sent by the at least a first content provider to the client at recurring intervals, has not been received by the client within a specified period of time, wherein the application is configured to automatically connect, at the client, to a second data center and to receive the content from the second data center in response to the determining that the failure occurred.

2. The non-transitory computer-readable medium of claim 1, wherein the instructions further comprise:

instructions to send a request for information using a first identifier to the first data center; and instructions to receive a plurality of IP addresses, the plurality of IP addresses including global and specific IP addresses, the global IP addresses corresponding to the first identifier and the specific IP addresses corresponding to a second identifier, wherein the application is configured to automatically connect to the second data center using one of the specific IP addresses for the second data center in response to the determining that the failure occurred.

3. The non-transitory computer-readable medium of claim 2, wherein the application is an unsigned application.

4. The non-transitory computer-readable storage medium of claim 1, wherein the content is live content that dynamically changes over time.

5. The non-transitory computer-readable storage medium of claim 1, wherein the automatically connecting occurs substantially simultaneously with the determination that the failure occurred.

6. A non-transitory computer-readable medium having instructions stored thereon, the instructions comprising:

instructions to receive, at a client, an application from a first data center, the first data center being configured to receive content from a content provider; and instructions to request the content from the first data center via the received application, wherein the application is configured to determine, at the client, an occurrence of a failure between the content provider and the first data center if a status message, configured to be sent by the content provider and identifying the content served to the client, has not been received by the client within a specified period of time, and wherein the application is further configured to automatically connect the client to a second data center in response to the determining that the failure occurred.

7. The non-transitory computer-readable medium of claim 6, wherein the instructions further comprise:

instructions to receive, at the client, a plurality of IP addresses from the first data center, the plurality of IP addresses including global and specific IP addresses, the global IP addresses corresponding to a first identifier and the specific IP addresses corresponding to a second identifier, wherein the application is configured to automatically connect to the second data center using one of the specific IP addresses for the second data center in response to the determining that the failure occurred.

8. The non-transitory computer-readable storage medium of claim 7, wherein the first identifier comprises a first URL and the second identifier comprises a second URL.

9. The non-transitory computer-readable storage medium of claim 6, wherein the application is an unsigned application.

10. A method for failure recovery, the method comprising:

identifying, at a client, a first data center among a plurality of data centers that is closest to the client, the first data center being configured to receive content from a content provider;

receiving at the client, an application from the first data center, wherein the application is configured to connect to data centers having a same IP address as the first data center from which the application was downloaded; and requesting the content from the first data center via the received application, wherein the application is configured to determine, at the client, that a failure occurred between the content provider and the first data center if a status message, configured to be sent by the content provider and identifying the content served to the client, has not been received by the client within a specified period of time, and wherein the application is further configured to automatically connect, at the client, to a second data center to receive the content from the second data center in response to the determining that the failure occurred.

11. The method of claim 10, further comprising:

receiving, at the client, a plurality of IP addresses, the plurality of IP addresses including global and specific IP addresses, the global IP addresses corresponding to a first identifier and the specific IP addresses corresponding to a second identifier, wherein the application is configured to automatically connect to the second data center using one of the specific IP addresses for the second data center in response to the determining that the failure occurred.

12. The method of claim 11, wherein the application is an unsigned application.

13. The method of claim 11, wherein the first identifier comprises a first URL and the second identifier comprises a second URL.

14. The method of claim 10, wherein the application is application download information.

15. The method of claim 14, wherein the application download information is an applet tag.

16. The method of claim 12, wherein the unsigned application is a Java applet.

17. The method of claim 12, wherein the unsigned application is able to connect to a data center having the same IP address as the first data center from which the unsigned application was downloaded.

18. The method of claim 17, wherein the unsigned application connects to the data center using a secure connection, wherein security of the secure connection is ensured by a certificate sent by the data center.

19. The method of claim 18, wherein the certificate contains information of an identifier associated with the data center that sent the certificate.

20. The method of claim 19, wherein an error results if the identifier contained in the certificate does not match the identifier associated with the data center that sent the certificate.

21. A method for failure recovery, the method comprising:

identifying, at a client, a first data center among a plurality of data centers that is closest to the client, the first data center being configured to receive content from a content provider;

automatically requesting via a client application downloaded from the first data center, a connection to a second data center, in response to a determination by the application that a failure occurred between the content provider and the first data center, wherein the determination that the failure occurred is made if a status message, configured to be sent by the content provider and identifying the content served to the client, has not been received by the client within a specified period of time; and after the application has connected to the second data center, receiving the content at the client from the content provider through the second data center.

22. The method of claim 21, further comprising:

receiving, at the client, from the first data center, a first set of one or more global IP addresses associated with a first identifier and a first set of one or more specific IP addresses associated with a second identifier; and receiving, at the client, from the second data center, a second set of one or more global IP addresses associated with the first identifier and a second set of one or more specific IP addresses associated with a third identifier.

23. The method of claim 22, wherein the client receives the first set of one or more global IP addresses and the first set of specific IP addresses via the client application from the first data center.

24. The method of claim 23, wherein the connection request includes a request for an identifier.

25. The method of claim 21, further comprising:

prior to receiving the content at the client from the content provider through the second data center, registering a plurality of object IDs used to serve the content to the client.

26. The method of claim 25, wherein the plurality of object IDs are associated with live objects to be displayed on a webpage.

27. The method of claim 25, wherein the status message is associated with a respective one of the plurality of object IDs.

28. The method of claim 25, wherein a respective one of the plurality of object IDs is used as the status message.

29. The method of claim 28, wherein the plurality of object IDs represent stock quotes.

30. The method of claim 28, wherein the content served for the respective one of the object IDs is served to the client at specified time intervals.

31. A method for determining a content delivery failure over a computer network at a client, the method comprising:

in response to a status message identifying content served to the client and sent to the client from a content provider through a first data center, wherein the status message is associated with an ID of the content provider, determining that a content delivery failure has occurred between the content provider and the first data center if the status message with associated content provider ID is not received at the client after a certain period of time.

32. The method of claim 31, further comprising:

receiving an application from the first data center at the client, wherein the application responds to the determination that the content delivery failure has occurred by automatically connecting the client to a second data center to receive the content from the second data center.

33. The method of claim 31, wherein the status message is sent at recurring time intervals designated by the client.

34. The method of claim 31, wherein the status message is sent at recurring time intervals designated by the content provider.

35. A non-transitory computer-readable medium having instructions stored thereon, the instructions comprising:

instructions to identify, at a client, a first data center among a plurality of data centers that is closest to the client, the first data center being configured to receive content from a content provider;

instructions to determine, in response to a status message identifying the content served to the client and sent from the content provider through the first data center to the client, that a content delivery failure has occurred between the content provider and the first data center if the status message is not received at the client for a certain period of time, wherein the status message includes an ID of the content provider; and receiving an application from the first data center at the client, wherein the application responds to the determination that the content delivery failure has occurred by automatically connecting the client to a second data center to receive the content from the second data center.

36. A non-transitory computer-readable medium having instructions stored thereon, the instructions comprising:

instructions to resolve a URL, at a client, into one or more IP addresses associated with a plurality of data centers, wherein each data center includes a routing network configured to receive content from at least a first content provider and to forward the content to the client;

instructions to identify, at the client, a first data center among the plurality of data centers that is closest to the client;

instructions to request, at a client, an application from the first data center;

instructions to receive, at the client, information related to the application, wherein the information comprises application download information;

instructions to download the application, at the client, using the application download information, from the first data center;

instructions to determine, at the client, a status message identifying content served to the client to be sent from the at least a first content provider to the client;

instructions to determine, at the client, that a failure occurred between the at least a first content provider and the first data center if the status message has not been received by the client after a client-predetermined period of time; and instructions to automatically connect, at the client, to a second data center to receive the content from the second data center in response to the determining that the failure occurred.

37. The non-transitory computer-readable medium of claim 36, wherein the one or more IP addresses are ordered into a list of IP addresses based on a distance between a server associated with each of the one or more IP addresses and the client.

38. The non-transitory computer-readable medium of claim 37, wherein global IP addresses are ordered to occur before specific IP addresses on the list of IP addresses.

39. The non-transitory computer-readable medium of claim 36, wherein the client registers object IDs used to serve content to the client.

* * * * *